US006920120B2

(12) United States Patent
Huang et al.

(10) Patent No.: US 6,920,120 B2
(45) Date of Patent: Jul. 19, 2005

(54) SYSTEM AND METHOD OF SCHEDULING RADIO RESOURCES IN A WIRELESS COMMUNICATIONS NETWORK

(75) Inventors: Dongjie Huang, Plano, TX (US); Jianxu Shi, Dallas, TX (US)

(73) Assignee: Ericsson Inc., Plano, TX (US)

( * ) Notice: Subject to any disclaimer, the term of this patent is extended or adjusted under 35 U.S.C. 154(b) by 532 days.

(21) Appl. No.: 10/226,044

(22) Filed: Aug. 22, 2002

(65) Prior Publication Data

US 2004/0037286 A1 Feb. 26, 2004

(51) Int. Cl.$^7$ ................................................ H04B 7/00
(52) U.S. Cl. ...................... 370/329; 370/341; 370/412; 370/420; 370/428; 370/431; 455/450
(58) Field of Search ................................ 370/229–231, 370/310, 329, 341, 412, 416, 420, 428, 431; 455/450–452.2

(56) References Cited

U.S. PATENT DOCUMENTS

| 6,016,316 A | * | 1/2000 | Moura et al. | ............... 370/389 |
| 2001/0036154 A1 | * | 11/2001 | Takagi | ........................ 370/229 |
| 2005/0058147 A1 | * | 3/2005 | Regnier et al. | ............. 370/412 |

FOREIGN PATENT DOCUMENTS

EP          1 130 872 A1     9/2001

OTHER PUBLICATIONS

I. Lopez et al., "Downlink Radio Resource Management for IP packet services in UMTS", IEEE Proceedings, VTC2001—Spring 2001, 5 pages.

J. M. Holtzman, "CDMA Forward Link Waterfilling Power Control", IEEE PRoceedings, VTC—Spring 2001, 5 pages.

* cited by examiner

*Primary Examiner*—Steven Nguyen
*Assistant Examiner*—Roberta A Stevens
(74) *Attorney, Agent, or Firm*—Steven W. Smith

(57) ABSTRACT

A system and method of scheduling radio resources in a packet-switched wireless communications network. A plurality of data packets from a plurality of users are placed in a First-In-First-Out (FIFO) queue and are sequentially selected and analyzed for transmission. If a selected packet has an instantaneous radio channel quality (C/I) greater than a historical channel quality value, the packet is transmitted. If the instantaneous C/I is not greater than the historical value, it is determined whether the selected packet has been held for longer than a threshold time period. If so, the selected packet is transmitted. If neither condition is met, the selected packet is temporarily held in its position in the queue while analyzing the next packet for transmission. If no packets qualify for transmission, the packet in the first position is transmitted. After each transmission, the analysis starts again at the head of the queue.

16 Claims, 6 Drawing Sheets

SYSTEM AND METHOD OF SCHEDULING RADIO RESOURCES IN A WIRELESS COMMUNICATIONS NETWORK

BACKGROUND OF THE INVENTION

1. Technical Field of the Invention

This invention relates to telecommunication systems. More particularly, and not by way of limitation, the present invention is directed to a system and method of scheduling radio resources for Quality of Service (QoS) in a wireless communications network.

2. Description of Related Art

Wireless telecommunication networks are evolving from second generation (2G) circuit-switched networks to third generation (3G) packet-switched networks. "Third generation" is the terminology used for packet-switched mobile access systems such as the General Packet Radio Service (GPRS) and the Universal Mobile Telecommunication System (UMTS). The third generation mobile communications system allows multiple mobile users to access and share network radio resources.

Radio resources are limited, and therefore must be managed. There are two objectives of radio resource management: (1) provide the highest attainable Quality of Service (QoS) for individual users, and (2) optimize the utilization of network resources. To achieve these objectives in the UMTS system, new radio resource management algorithms need to be developed for packet admission and scheduling, system load control, and power control.

Packet scheduling is a mechanism that determines which user has the right to transmit in a given time interval. It is well-known that round robin scheduling provides fairness for all users at the expense of user and system throughput. First-In-First-Out (FIFO) scheduling provides optimum user and system throughput for well-behaved traffic if all channels have the same quality. However, wireless channels exhibit frequent variation of quality. To maximize system throughput, radio resources should be assigned to the user with the best channel quality. However, a scheduling methodology based purely on channel quality would be unfair to users with poor channel quality, leading to their potential starvation and excessive delay. Therefore, there is a trade-off between fairness and throughput.

An existing method of scheduling IP packets is described in the IEEE article, "Downlink Radio Resource Management for IP Packet Services in UMTS," by I. Lopez, P. J. Ameigeiras, J. Wigard, and P. Morgensen (referred to hereinafter as "Lopez"). In Lopez, a modified round robin algorithm is proposed as an intermediate solution for fairness and throughput. At every round robin cycle, a packet from each user is admitted and queued according to arrival sequence. When a user"s packet is scheduled for transmission, the user"s instantaneous channel quality is compared to a threshold historical value. If the channel quality is above the historical threshold, resources are allocated, and the packet is transmitted. Otherwise, the user is moved to the end of the queue. All known schemes use historical and current channel conditions to predict the future channel conditions for packet scheduling.

It is shown in Lopez that the modified round robin methodology provides fairness to all users in the system, and the throughput distribution is very close to that of a normal round robin approach, with some improvement. But the throughput for the modified round robin methodology is significantly less than that of the pure channel quality methodology.

Another solution is described in the IEEE article, "CDMA Forward Link Waterfilling Power Control," by J. M. Holtzman (referred to hereinafter as "Holtzman"). In Holtzman, a compromise is reached by assigning priorities to all users. A user's priority is defined as the ratio of the user's channel quality to the user's throughput in a given time period. If all users have the same throughput, the user that has the best channel quality is allocated resources. Therefore, the user with the best channel quality will have higher throughput. However, the higher throughput, in turn, reduces the user's priority. Eventually, when priorities are re-calculated at the end of a time period, the process may assign a higher priority to a user with poorer channel quality.

In Holtzman, if the channel quality is the same for all users, or if the time period "window" used for calculating past throughput is too short, throughput will approach the round robin methodology. If the window is too long, this method will provide slow response for user priority and will lead to unfairness to users with poor channel quality.

In order to overcome the disadvantage of existing solutions, it would be advantageous to have a system and method of scheduling radio resources that achieves the throughput level of the pure channel quality methodology while also achieving fairness close to the round robin methodology. The present invention provides such a system and method.

SUMMARY OF THE INVENTION

The present invention is a system and method of scheduling radio resources in a packet-switched wireless communications network. A plurality of data packets from a plurality of users are placed in a First-In-First-Out (FIFO) queue and are sequentially selected and analyzed for transmission. If a selected packet has an instantaneous radio channel quality (C/I) greater than a historical channel quality value, the packet is transmitted. If the instantaneous C/I is not greater than the historical value, it is determined whether the selected packet has been held for longer than a threshold time period. If so, the selected packet is transmitted. If neither condition is met, the selected packet is temporarily held in its position in the queue while analyzing the next packet for transmission. If no packets qualify for transmission, the packet in the first position is transmitted. After each transmission, the analysis starts again at the head of the queue.

Thus, in one aspect, the present invention is directed to a method of scheduling radio resources in a packet-switched wireless communications network. The method includes the steps of admitting a plurality of data packets from a plurality of users, each of the packets having an associated user with an allocated radio channel; and placing the plurality of data packets in a FIFO queue having a plurality of packet positions in which the packet that has been in the queue for the longest time is in the first position. Starting with the packet in the first position, the method then sequentially selects and analyzes each of the packets for transmission. A selected packet is transmitted if the allocated radio channel associated with the selected packet has an instantaneous radio channel quality greater than a historical channel quality value. The selected packet is temporarily held in its position in the queue while analyzing a selected packet in the next position in the queue, if the allocated radio channel does not have an instantaneous radio channel quality greater than the historical channel quality value.

The step of analyzing each of the packets for transmission may also include determining whether a selected packet has been held in the queue for a time period longer than a predefined threshold time period, if the radio channel associated with the selected packet does not have an instantaneous radio channel quality greater than the historical channel quality value. If the selected packet has been held in the queue for a time period longer than a predefined threshold time period, it is transmitted. If not, the method may include determining whether the selected packet is the last packet in the queue to be analyzed. If so, the packet in the first position in the queue is transmitted. After each transmission, the analysis starts again at the head of the queue.

In another aspect, the present invention is a system for scheduling radio resources in a packet-switched wireless communications network. The system includes means for admitting a plurality of data packets from a plurality of users; and a FIFO queue for temporarily holding the admitted data packets while the packets are analyzed for transmission. The FIFO queue has a plurality of packet positions in which the packet that has been in the queue for the longest time is in the first position. Beginning with the packet in the first position, the system also includes means for sequentially selecting and analyzing each packet in the queue to determine whether a radio channel associated with the selected packet has an instantaneous radio channel quality greater than a historical channel quality value. Upon determining that the associated radio channel has an instantaneous radio channel quality greater than the historical channel quality value, the system includes means for transmitting the selected packet. If the associated radio channel does not have an instantaneous radio channel quality greater than the historical channel quality value, the system also includes means for temporarily holding the selected packet in its position in the queue while analyzing the next packet in the queue to determine whether the next packet should be transmitted.

The system may also include means for determining whether a selected packet has been held in the FIFO queue longer than a predefined time period, and means for transmitting the selected packet if the selected packet has been held in the FIFO queue longer than the predefined time period. The system may also include means for determining whether a selected packet is the last packet in the queue to be analyzed for transmission, and means for transmitting the packet in the first position in the queue if the selected packet is the last packet in the queue to be analyzed.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention uses predicted channel quality and a modified FIFO approach in radio resource management to support QoS and to maximize system throughput. The objective of the present invention is to achieve the throughput level of the pure channel quality methodology while achieving fairness close to the round robin methodology at the same time. Note that the pure channel quality methodology is the same as the FIFO methodology when channel quality is the same for all users. With the shortcomings of the existing methodologies in mind, the present invention obtains the best in the pure channel quality methodology and the round robin methodology.

First, the present invention modifies the FIFO procedure with the channel quality methodology to optimize system throughput. Second, fairness is enforced by modifying the channel quality methodology. The channel quality methodology is implemented by temporarily holding back the user that experiences bad channel quality while keeping the user at the same position in the FIFO queue. As a result, the user is served as soon as his channel quality improves, unlike the Lopez modified round robin approach in which the user with poor channel quality is moved to the end of the queue. The present invention recognizes that if the user is moved to the end of the queue, the user misses all subsequent opportunities to transmit when channel conditions improve before the user's next turn.

The present invention also maintains the sequence of packet arrivals, which is important to fairness. This is superior to Holtzman's priority methodology in which resource allocation only reacts to user-experienced throughput.

Figure 1:
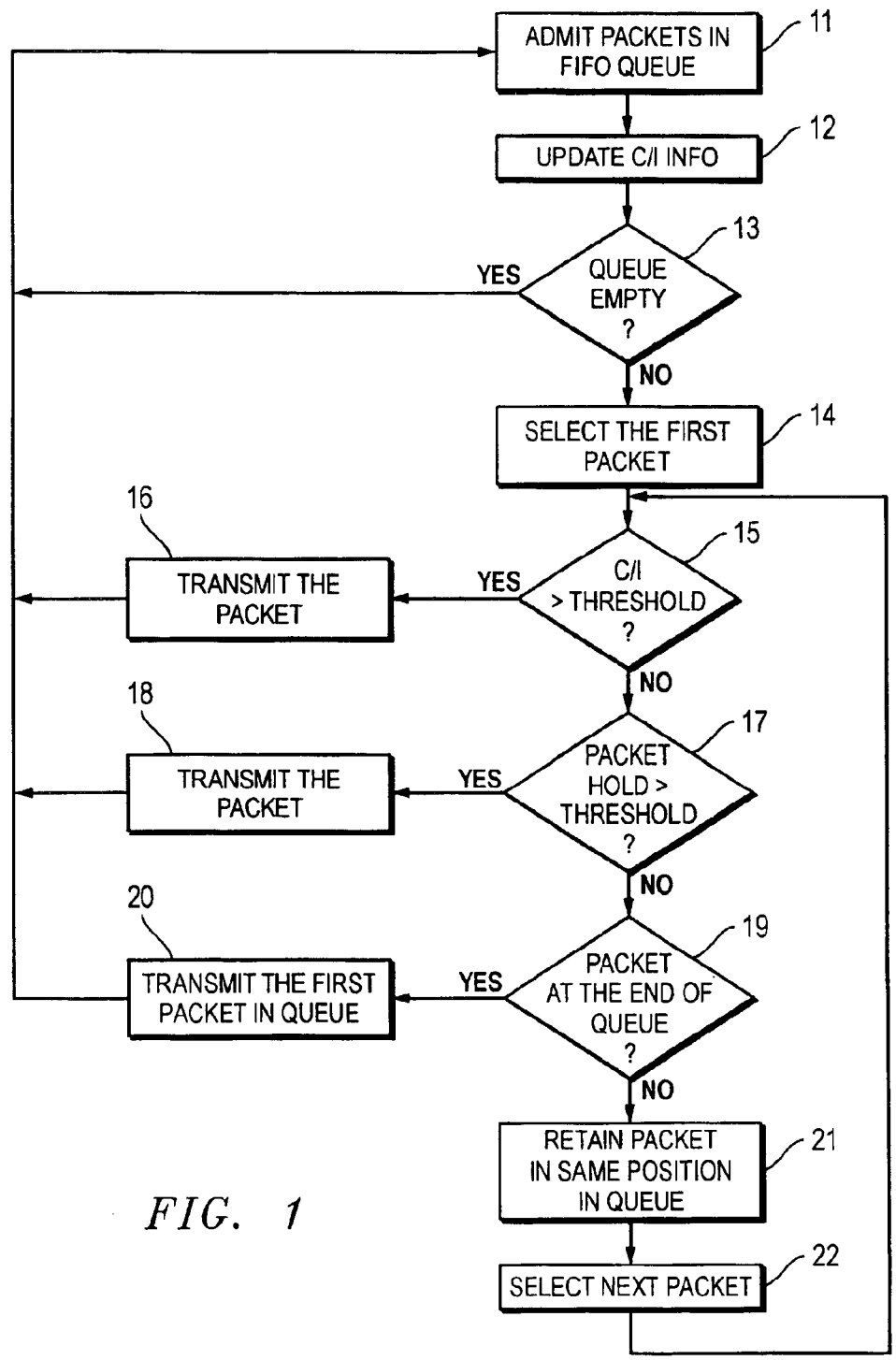
FIG. 1 is a flow chart illustrating the steps of the preferred embodiment of the method of the present invention.

FIG. 1 is a flow chart illustrating the steps of the preferred embodiment of the method of the present invention. At step 11, packets from each user are admitted to the network according to an admission algorithm such as, for example, a Leaky Bucket algorithm. Admitted packets are saved in a FIFO queue. At step 12, each user's channel quality information (e.g., Carrier-to-Interference (C/I) ratio) is updated. Channel quality may be reported by mobile stations as, for example, a Bit Error Rate (BER), which is used by the Base Station Controller (BSC) to estimate the C/I. At step 13, it is determined whether the FIFO queue is empty. If so, the process returns to step 11 and admits additional user packets. If the queue is not empty, the process moves to step 14 where the first packet in the queue is selected for analysis.

At step 15, the instantaneous channel quality (i.e., C/I) of the user of the packet being analyzed is compared to a threshold historical value. If the instantaneous channel quality is above the historical threshold, the packet being analyzed is transmitted at step 16. If the instantaneous channel quality is not above the historical threshold, the process moves to step 17 where it is determined whether the packet being analyzed has been held in the queue for a time period longer than a predefined threshold period of time. If the packet has been held for a time period longer than the time threshold, the packet being analyzed is transmitted at step 18. If the packet has not been held for a time period longer than the time threshold, the process moves to step 19 where it is determined whether the packet being analyzed is the last packet in the queue to be analyzed. If so, the packet in the first position in the queue is transmitted at step 20. If the packet being analyzed is not the last packet in the queue, the packet is retained at the same position in the queue at step 21, and the next packet in the queue is selected for analysis at step 22. The process then returns to step 15 where the next packet is analyzed according to the same methodology. After each transmission at steps 16, 18, or 20, the procedure returns to step 11, admits additional packets to the queue, and repeats the procedure.

EXAMPLES

Figure 2:
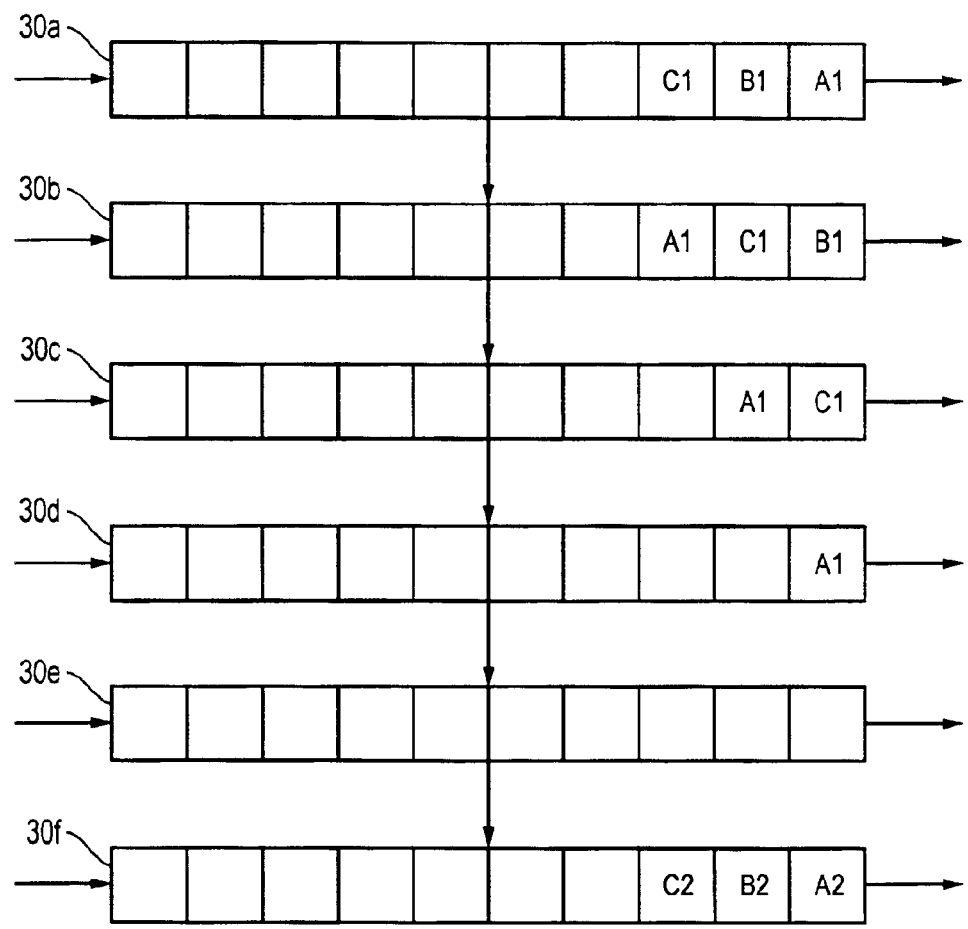
FIG. 2 (Prior Art) is a flow chart illustrating the sequence of packet transmissions from a packet queue when scheduling is performed using the existing modified round robin methodology.

FIG. 2 is a flow chart illustrating an exemplary sequence of packet transmissions from a packet queue 30 when scheduling is performed using the existing modified round robin methodology of Lopez. At 30*a*, three packets (A1, B1, and C1) from User-A, User-B, and User-C, respectively, are queued. The process starts at the head of the queue (packet A1) and determines, in the illustrated example, that User-A's C/I is less than the historical threshold value. Therefore, at 30*b*, packet A1 is moved to the end of the queue. Thereafter, even if User-A's C/I improves, there will not be an opportunity to transmit packet A1 until it again arrives at the head of the queue.

At 30*c*, it is determined that User-B's C/I is greater than the historical threshold value. Therefore, packet B1 is transmitted, and the remaining packets (C1 and A1) shift one slot toward the head of the queue. At 30*d*, it is determined that User-C's C/I is greater than the historical threshold value. Therefore, packet C1 is transmitted, and the remaining packet (A1) shifts one slot to the head of the queue. At 30*e*, packet A1 is finally transmitted, and at 30*f*, new packets are admitted according to the round robin methodology. Thus, although the prior art modified round robin methodology is fair because it takes turns between users, the methodology has lower user throughput because only one packet is queued for each user at a time, and because, for example, a particular user's C/I may have improved long before the user's packet again reaches the head of the queue.

Figure 3A:
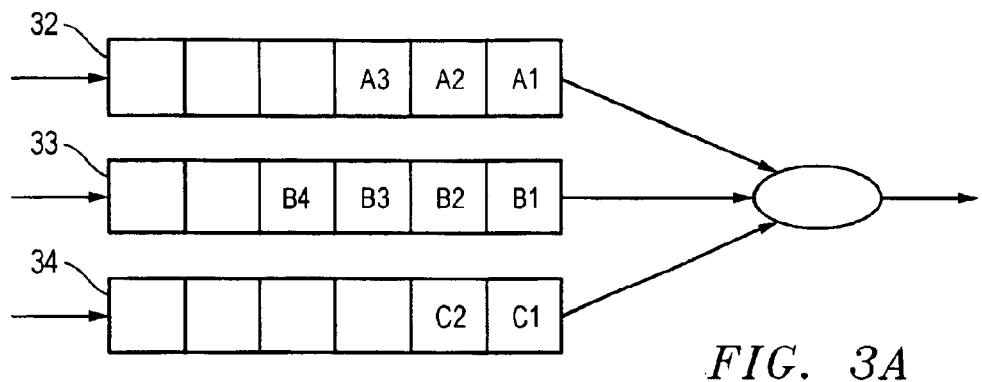
FIGS. 3A–3E (Prior Art) illustrate an exemplary sequence of packet transmissions from a plurality of packet queues when scheduling is performed using the existing priority-based methodology.
Figure 3B:
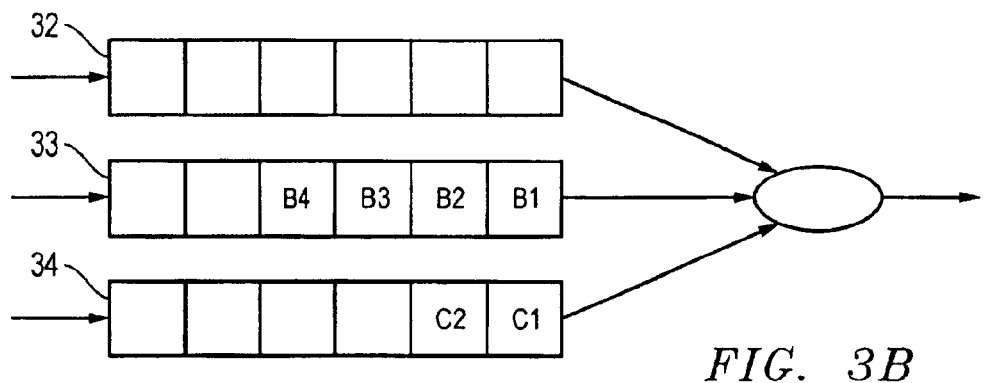
Figure 3C:
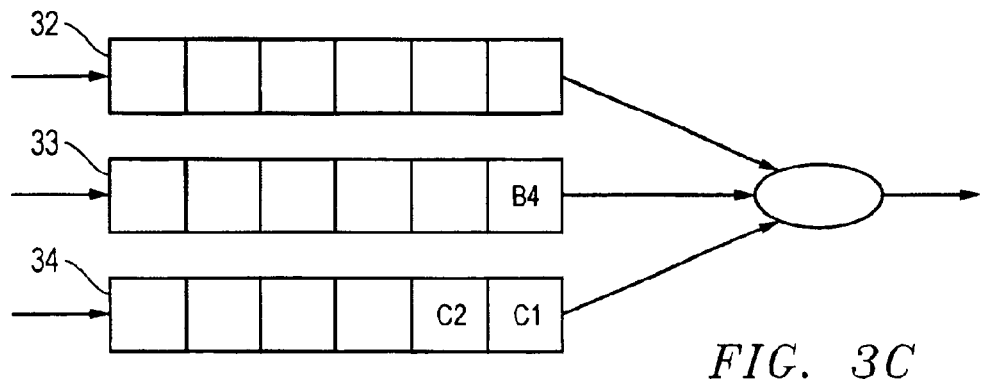

FIGS. 3A–3E illustrate an exemplary sequence of packet transmissions from a plurality of packet queues 32–34 when scheduling is performed using the existing priority-based methodology of Holtzman. The packets from each user are placed in a separate queue, and a priority is calculated for each user based on the ratio of the user's instantaneous C/I to the user's historical throughput, as calculated over a given time period or filtering window. The priority for each user is recalculated after each packet is transmitted. In FIG. 3A, queue 32 is shown to hold packets A1–A3; queue 33 holds packets B1–B4, and queue 34 holds packets C1–C2. In the example illustrated, the filtering window for calculating historical throughput is relatively long, and User-A is calculated to have the highest priority. Therefore, as shown in FIG. 3B, packets A1–A3 are all transmitted before User-A's historical throughput rises enough to reduce User-A's priority below the priority of User-B. User-B is then calculated to have the highest priority, and as shown in FIG. 3C, packets B1–B3 are transmitted before User-'s historical throughput rises enough to reduce User-B's priority below the priority of User-C. If User-C is calculated to have the highest priority after transmitting packet B3, packet B4 is left in queue 33.

Figure 3D:
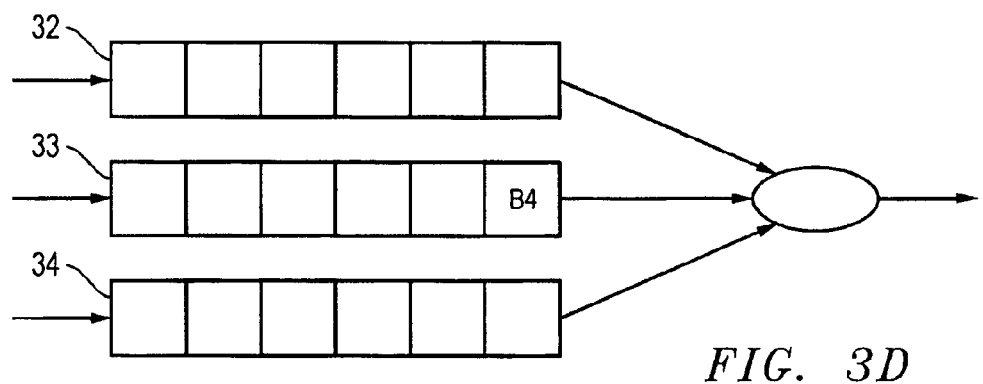
Figure 3E:
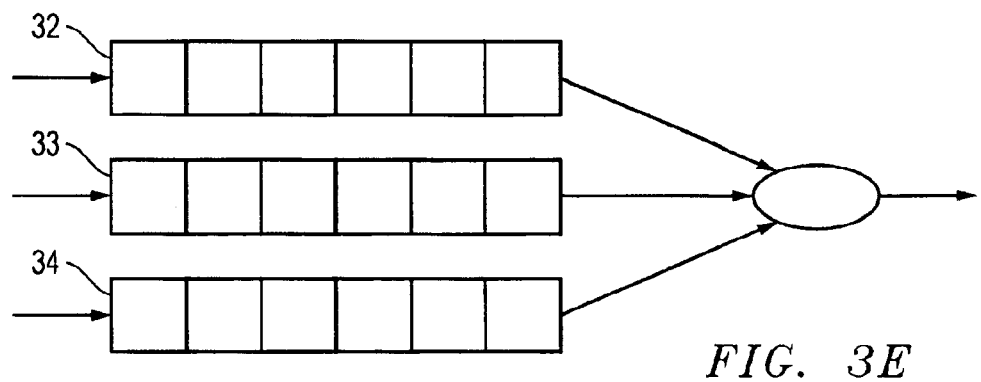

Referring now to FIG. 3D, User-C is then calculated to have the highest priority, and packets C1–C2 are transmitted next. This leaves only packet B4 in queue 33 while queues 32 and 34 are empty. Finally, as shown in FIG. 3E, packet B4 is transmitted. Thus, the prior art priority-based methodology of Holtzman provides slow response for user priority, leads to unfairness to users with poor channel quality, or transmits packets of users with poor channel quality over a long period of time, causing low system throughput.

Figure 4:
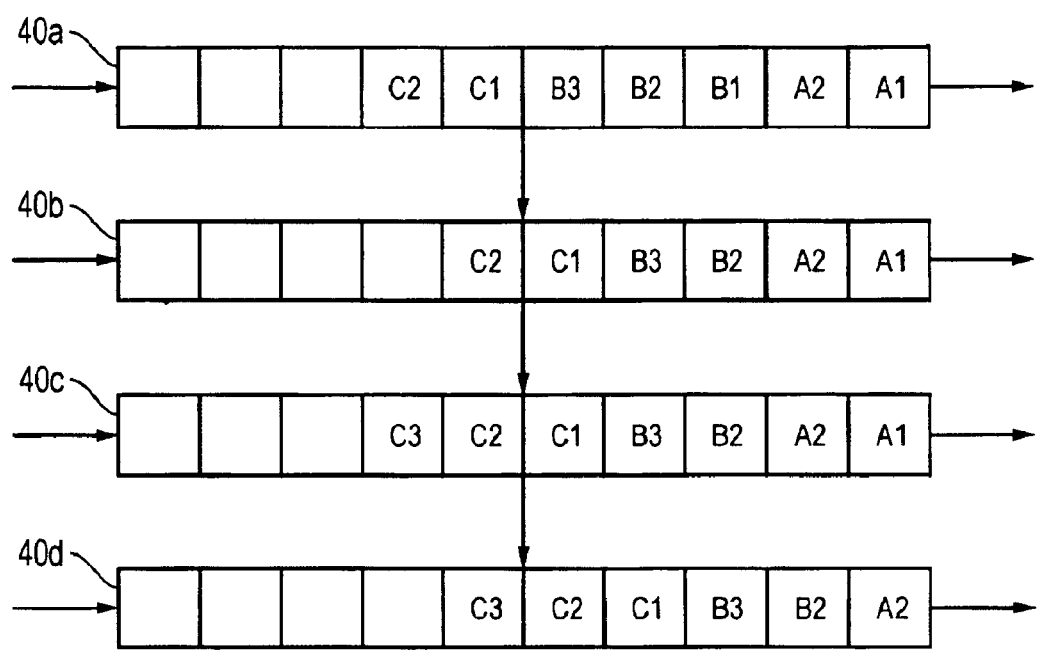
FIG. 4 is a flow chart illustrating an exemplary sequence of packet transmissions from a packet queue when scheduling is performed using the method of the present invention.

FIG. 4 is a flow chart illustrating an exemplary sequence of packet transmissions from a packet queue 40 when scheduling is performed using the method of the present invention. At 40*a*, seven packets (A1–A2, B1–B3, and C1–C2) from User-A, User-B, and User-C, respectively, are queued in a FIFO queue. The process starts at the head of the queue (packet A1) and, in the illustrated example, determines that (1) User-A's C/I is less than the historical threshold value, (2) the hold time for packet A1 is less than the time threshold, and (3) packet A1 is not the last packet in the queue to be analyzed. Therefore, packet A1 is retained in its position in the queue, and is not transmitted. Packet A2 may also be held for the same reasons. At 40*b*, packet B1 is analyzed and transmitted because it is determined that either User-B's C/I is greater than the historical threshold value, or the hold time for packet B1 is greater than the time threshold. Each of the packets after B1 shift to the right one slot while User-A's packets remain in the same position.

After each packet is transmitted, the process admits additional packets at the end of the queue, and then, starting again with the first packet, sequentially analyzes each packet in the queue until a packet meets one of the criteria for transmission. Thus at 40*c*, packet C3 is admitted at the end of the queue. Additionally, an analysis may show that User-A's C/I is now greater than the historical threshold value. Therefore, at 40*d*, packet A1 is transmitted, and the remaining packets shift to the right one slot. If User-A's C/I remains above the historical threshold value, packet A2 will be transmitted next. The process then continues by sequentially analyzing the next packet in the queue to determine whether the user's C/I is above the historical threshold value, or if not, whether the packet has been held for a time period greater than the time threshold. If either condition is met, the packet being analyzed is transmitted. If neither condition is met, and the packet is not the last packet in the queue to be analyzed, the packet is held in its present position, and the next packet is analyzed. If all of the packets fail to meet the criteria for transmission, the process determines that the packet selected for analysis is at the end of the queue, and the first packet in the queue is then transmitted. In this manner, the method of the present invention achieves the throughput level of the pure channel quality method while also achieving fairness close to the round robin method.

Figure 5:
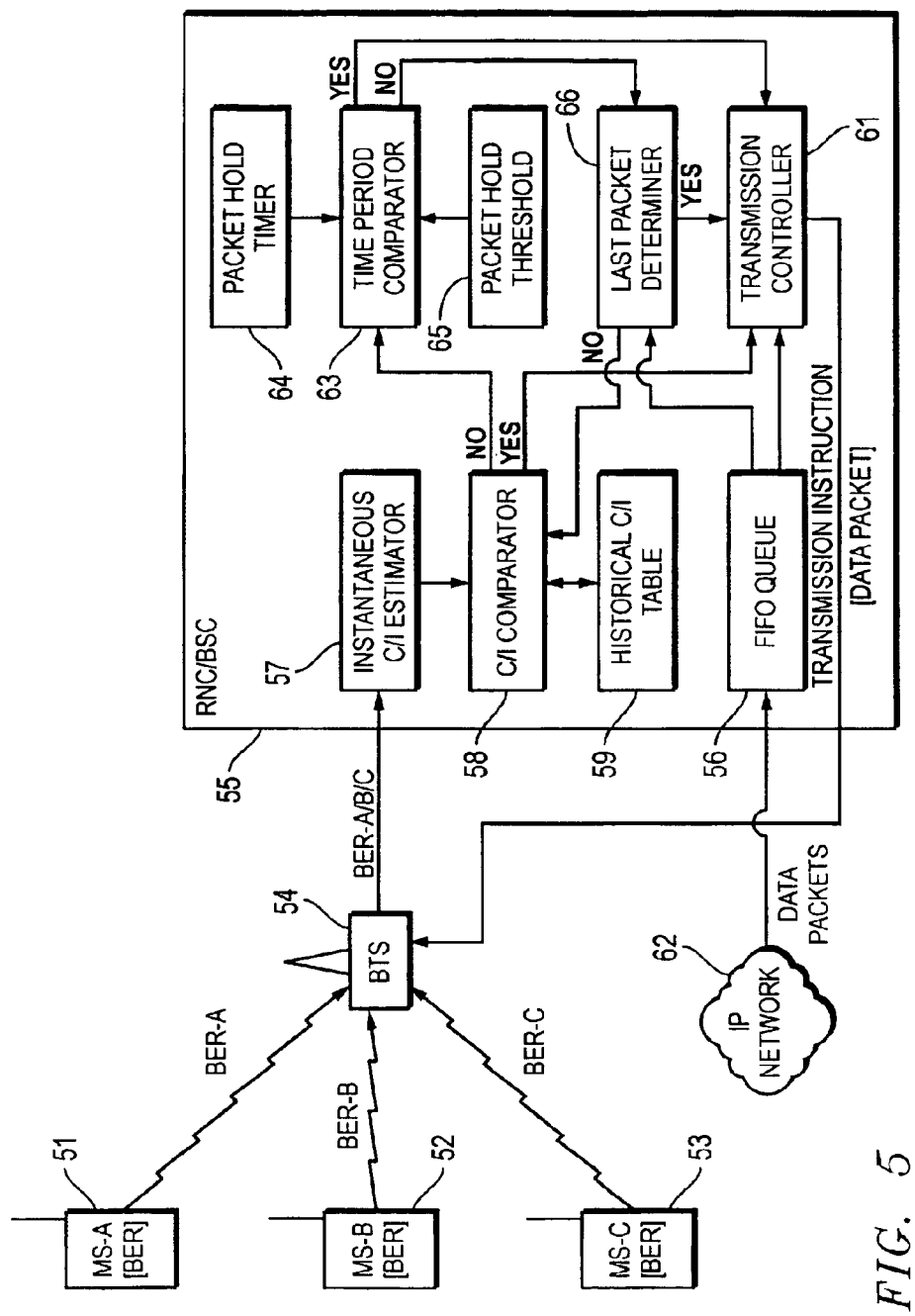
FIG. 5 is a simplified block diagram of the preferred embodiment of the system of the present invention.

FIG. 5 is a simplified block diagram of the preferred embodiment of the system of the present invention. A plurality of MSs, MS-A 51, MS-B 52, and MS-C 53 communicate via radio channels to a Base Transceiver Station (BTS) 54. The MSs determine and report, among other things, the Bit Error Rate (BER) being experienced on the downlink of their respective radio channels. The BTS is linked to a Radio Network Controller (RNC) or Base Station Controller (BSC) 55. Data packets destined for the MSs are received from an Internet Protocol (IP) network 62, and are admitted to a FIFO queue 56. The BTS also reports the BER and other information for each radio channel to the RNC/BSC where it is utilized in an Instantaneous C/I Estimator 57 to estimate the instantaneous C/I for each radio channel.

When a selected packet is being analyzed for transmission to its associated MS, the estimate of the associated MS's instantaneous radio channel C/I is sent from the Estimator 57 to a C/I Comparator 58 which compares the estimate with a historical C/I value drawn from a Historical C/I Table 59. If the instantaneous radio channel C/I is greater than the historical value, a Transmission Controller 61 sends a transmission instruction to the BTS 54 to transmit the selected data packet to the destination MS.

If the instantaneous radio channel C/I is not greater than the historical value, a Time Period Comparator 63 is utilized to determine whether the packet hold time, as determined by a Packet Hold Timer 64 is greater than an allowed Packet Hold Threshold 65. If the packet hold time is greater than the Packet Hold Threshold, the Transmission Controller 61 instructs that the selected packet be transmitted.

If the packet hold time is not greater than the Packet Hold Threshold, a Last Packet Determiner 66 determines whether or not the selected packet is the last packet in the queue to be analyzed. If not, another packet is selected, and the process returns to the C/I Comparator 58 to compares the instantaneous radio channel C/I for the newly selected packet with the channel's historical C/I value. However, if the Last Packet Determiner determines that the selected packet is the last packet in the queue to be analyzed, the Transmission Controller 61 instructs that the first packet in the queue be transmitted.

It is thus believed that the operation and construction of the present invention will be apparent from the foregoing description. Those skilled in the art will recognize that the various functional elements of the system, as described herein and depicted in FIG. 5, may be implemented in hardware, software, or combinations thereof providing programmed instructions executable by a general or specific purpose computer, or the like. For example, while the teachings of the present invention have been particularly exemplified within the context of an actual RNC or BSC in a radio telecommunications network, those skilled in the art will recognize that the present invention may be practiced in conjunction with a simulator that is capable of modeling a reference platform as well. Also, whereas the use of specific functional elements have been described in reference to the presently preferred exemplary embodiment of the present invention, such implementations are merely illustrative. Accordingly, all such modifications, extensions, variations, amendments, additions, deletions, combinations, and the like are deemed to be within the ambit of the present invention whose scope is defined solely by the claims set forth hereinbelow.

What is claimed is:

1. A method of scheduling radio resources in a packet-switched wireless communications network, said method comprising the steps of:
    admitting a plurality of data packets from a plurality of users, each of said packets having an associated user with an allocated radio channel;
    placing the plurality of data packets in a First-In-First-Out (FIFO) queue having a plurality of packet positions in which the packet that has been in the queue for the longest time is in the first position;
    starting with the packet in the first position, sequentially selecting and analyzing each of the packets for transmission;
    transmitting a selected packet if the allocated radio channel associated with the selected packet has an instantaneous radio channel quality greater than a historical channel quality value;
    temporarily holding the selected packet in its position in the queue while analyzing a selected packet in the next position in the queue, if the allocated radio channel does not have an instantaneous radio channel quality greater than the historical channel quality value; and
    after a packet is transmitted, starting again with the packet in the first position and sequentially selecting and analyzing each of the packets for transmission.

2. The method of scheduling radio resources of claim 1 wherein the step of analyzing each of the packets for transmission includes:
    determining whether the allocated radio channel associated with a selected packet has an instantaneous radio channel quality greater than a historical channel quality value;
    if not, determining whether the selected packet has been held in the queue for a time period longer than a predefined threshold time period; and
    if not, determining whether the selected packet is the last packet in the queue to be analyzed.

3. The method of scheduling radio resources of claim 2 further comprising transmitting a selected packet if the selected packet has been held in the queue for a time period longer than a predefined threshold time period.

4. The method of scheduling radio resources of claim 3 further comprising transmitting the packet in the first position in the queue if the selected packet is the last packet in the queue to be analyzed.

5. A method of scheduling radio resources in a packet-switched wireless communications network, said method comprising the steps of:
    (A) admitting a plurality of data packets from a plurality of users having associated radio channels;
    (B) placing the plurality of data packets in a First-In-First-Out (FIFO) queue having a plurality of packet positions in which the packet that has been in the queue for the longest time is in the first position;
    (C) selecting for analysis, the packet in the first position;
    (D) determining whether the radio channel associated with the selected packet has an instantaneous radio channel quality greater than a historical channel quality value;
    (E) transmitting the selected packet if the associated radio channel has an instantaneous radio channel quality greater than the historical channel quality value;
    (F) if the associated radio channel does not have an instantaneous radio channel quality greater than the historical channel quality value, temporarily holding the selected packet in its position in the queue while analyzing a next packet in a next position in the queue to determine whether the next packet should be transmitted; and
    (G) transmitting the packet in the first position in the queue whenever its associated radio channel is determined to have an instantaneous radio channel quality greater than the historical channel quality value.

6. The method of scheduling radio resources of claim 5 further comprising repeating steps (D) through (G) for each subsequent packet in the queue.

7. The method of scheduling radio resources of claim 5 further comprising, before step (F) the steps of:
    determining whether the selected packet has been held for longer than a predefined time period, if the associated radio channel does not have an instantaneous radio channel quality greater than the historical channel quality value; and
    transmitting the selected packet if the selected packet has been held for longer than the predefined time period.

8. The method of scheduling radio resources of claim 7 further comprising, before step (F), the steps of:
    determining whether the selected packet is the last packet in the queue to be analyzed; and
    transmitting the packet in the first position in the queue if the selected packet is the last packet in the queue to be analyzed.

9. A method of scheduling radio resources in a packet-switched wireless communications network, said method comprising the steps of:
- (A) admitting a plurality of data packets from a plurality of users having associated radio channels;
- (B) placing the plurality of data packets in a First-In-First-Out (FIFO) queue having a plurality of packet positions in which the packet that has been in the queue for the longest time is in the first position;
- (C) selecting for analysis, the packet in the first position;
- (D) determining whether the radio channel associated with the selected packet has an instantaneous radio channel quality greater than a historical channel quality value;
- (E) transmitting the selected packet if the associated radio channel has an instantaneous radio channel quality greater than the historical channel quality value;
- (F) retaining the selected packet in its position in the queue if the associated radio channel does not have an instantaneous radio channel quality greater than the historical channel quality value; and
- (G) selecting a next packet in the queue, and repeating steps (D) through (F) for the next packet.

10. The method of scheduling radio resources of claim 9 further comprising, before step (F), the steps of:
- determining whether the selected packet is the last packet in the queue to be analyzed; and
- transmitting the packet in the first position in the queue if the selected packet is the last packet in the queue to be analyzed.

11. A method of scheduling radio resources in a packet-switched wireless communications network, said method comprising the steps of:
- (A) admitting a plurality of data packets from a plurality of users having associated radio channels;
- (B) placing the plurality of data packets in a First-In-First-Out (FIFO) queue having a plurality of packet positions in which the packet that has been in the queue for the longest time is in the first position;
- (C) selecting for analysis, the packet in the first position;
- (D) determining whether the radio channel associated with the selected packet has an instantaneous radio channel quality greater than a historical channel quality value;
- (E) transmitting the selected packet if the associated radio channel has an instantaneous radio channel quality greater than the historical channel quality value;
- (F) determining whether the selected packet has been held for longer than a predefined time period, if the associated radio channel does not have an instantaneous radio channel quality greater than the historical channel quality value;
- (G) transmitting the selected packet if the selected packet has been held for longer than the predefined time period;
- (H) retaining the selected packet in its position in the queue if the associated radio channel does not have an instantaneous radio channel quality greater than the historical channel quality value, and the selected packet has not been held for longer than the predefined time period; and
- (I) selecting a next packet in the queue and repeating steps (D) through (H) for the next packet and its user's radio channel.

12. The method of scheduling radio resources of claim 11 further comprising, before step (H), the steps of:
- determining whether the selected packet is the last packet in the queue to be analyzed; and
- transmitting the packet in the first position in the queue if the selected packet is the last packet in the queue to be analyzed.

13. The method of scheduling radio resources of claim 11 further comprising transmitting the packet in the first packet position whenever the associated user's radio channel is determined to have an instantaneous radio channel quality greater than the historical channel quality value.

14. A system for scheduling radio resources in a packet-switched wireless communications network, said system comprising:
- means for admitting a plurality of data packets from a plurality of users;
- a First-In-First-Out (FIFO) queue for temporarily holding the admitted data packets while the packets are analyzed for transmission, said FIFO queue having a plurality of packet positions in which the packet that has been in the queue for the longest time is in the first position;
- means for beginning with the packet in the first position, and sequentially selecting and analyzing each packet in the queue to determine whether a radio channel associated with the selected packet has an instantaneous radio channel quality greater than a historical channel quality value;
- means for transmitting the selected packet if the associated radio channel has an instantaneous radio channel quality greater than the historical channel quality value; and
- means for temporarily holding the selected packet in its position in the queue while analyzing the next packet in the queue to determine whether the next packet should be transmitted, if the associated radio channel does not have an instantaneous radio channel quality greater than the historical channel quality value.

15. The system for scheduling radio resources of claim 14 further comprising:
- means for determining whether a selected packet has been held in the FIFO queue longer than a predefined time period; and
- means for transmitting the selected packet if the selected packet has been held in the FIFO queue longer than the predefined time period, even if the associated radio channel does not have an instantaneous radio channel quality greater than the historical channel quality value.

16. The system for scheduling radio resources of claim 15 further comprising:
- means for determining whether a selected packet is the last packet in the queue to be analyzed for transmission; and
- means for transmitting the packet in the first position in the queue if the selected packet is the last packet in the queue to be analyzed.

* * * * *